March 4, 1958 J. T. DAVIDSON 2,825,559

FEEDING DEVICE FOR HIGH-SPEED PRINTERS

Filed May 27, 1955 2 Sheets-Sheet 1

INVENTOR.
JOHN T. DAVIDSON
BY Hudson, Boughton, Williams, David & Hoffmann
ATTORNEYS March 4, 1958 J. T. DAVIDSON 2,825,559

FEEDING DEVICE FOR HIGH-SPEED PRINTERS

Filed May 27, 1955 2 Sheets-Sheet 2

INVENTOR.
JOHN T. DAVIDSON
BY Hudson, Boughton, Williams, David & Hoffmann
ATTORNEYS United States Patent Office 2,825,559
Patented Mar. 4, 1958

2,825,559

FEEDING DEVICE FOR HIGH-SPEED PRINTERS

John T. Davidson, Dayton, Ohio, assignor to The Standard Register Company, Dayton, Ohio, a corporation of Ohio Application May 27, 1955, Serial No. 511,626

6 Claims. (Cl. 271—2.4)

This invention relates to strip feeding devices for record forms and particularly to strip feeding devices for automatically controlled high speed recording machines providing a control signal for positively advancing the record forms in response to the signal.

The large volume of clerical detail confronting present day business operations has led to the development of electronic data processing equipment for automatically handling a large portion of the clerical repetitive operations. An important element in these electrical processing or computing systems is the output recording device for permanently recording the resultant operations or computations of its associated system. These output recording devices or machines initially were in the form of conventional automatically controlled teletype equipment or automatically controlled electric typewriters. The development of electronic equipment progressed to the point where the speed of the available recording machines was below that of the rest of the electronic system. Accordingly, efforts have been directed toward increasing the speed of the recording devices.

An important factor in the development of any high speed recording system is the rate of advancement of a recording medium through the system. The aforementioned conventional recording systems are operable through movable hammers striking against a platen for mechanically imprinting upon a recording medium interposed therebetween. The platen may also be employed as a part of the feeding unit for supporting, positioning and advancing the recording medium. This conventional approach has proven too cumbersome for many of the high speed electronic recording systems.

A high speed recording machine has been developed which departs from the aforementioned conventional approach. This machine imprints upon a recording medium suspended between a series of movable hammers and an associated revolving typewheel presenting type fonts to the hammers and is commercially identified as the "Flying Typewriter." This unconventional recording technique presents unique problems in the advancing or feeding of a recording medium through the machine imprinting station. These problems are increased when a lined recording medium is used and manifold copies are desired therefrom. Accordingly, a feeding device operable at high speeds for positively and automatically advancing a recording medium through the recording station of a high speed recording machine in synchronism with the imprinting cycles of the machine characterized by a fast response time to advancing impulses provided by the recording machine is desired.

It is therefore an object of the invention to provide an improved feeding device capable of high speeds for positively and automatically advancing a recording medium lined or unlined in response to the advancing impulses provided by different types of high speed recording machines and allowing exact registration for manifold copies, yet having few parts.

It is another object of the invention to provide a high speed recording strip feeding device for a recording machine allowing the recording strips to be suspended through the machine recording station and yet positively advancing the strips through the station.

It is still another object of the invention to provide a high speed strip feeding device for positioning and positively advancing a record strip form through a recording station at high speeds while allowing the record forms to conform to the shape of the recording station and be reconditioned for engaging the advancing mechanism.

It is yet another object of the invention to provide a strip feeding device for a high speed recording machine of the aforementioned character and immediately responding to impulses to positively feed record forms through the recording station in synchronism with the non-imprinting cycles of the machine through the action of a pair of platen supported pinwheels for supporting and conditioning the forms.

Further additional objects and advantages will become apparent hereinafter during the detailed description of an embodiment of the invention which is to follow and which embodiment is illustrated in the accompanying drawings forming part of the specification and wherein.

Figures 1, 5, 6, 7:
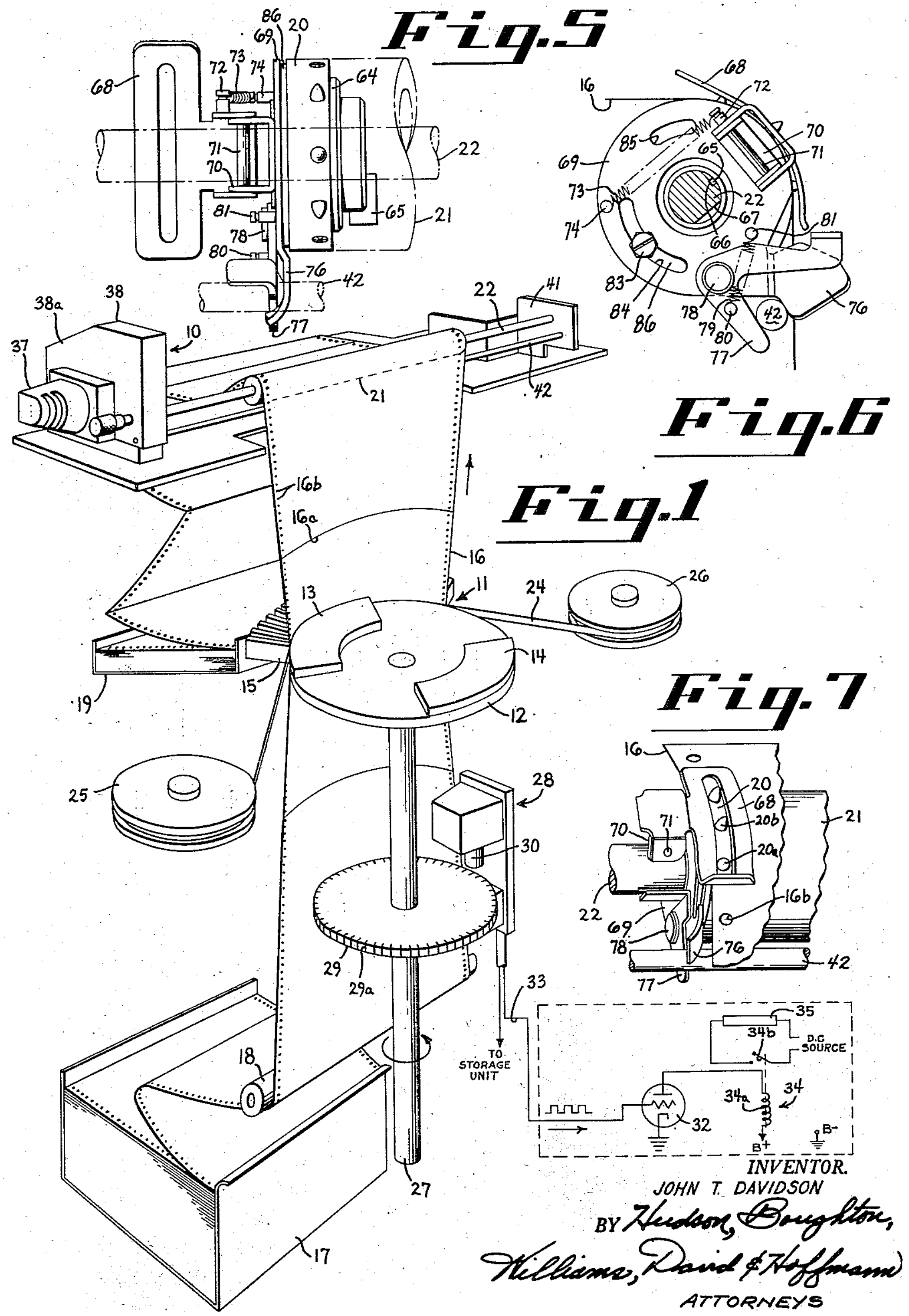
Fig. 1 is a diagrammatic representation of a high speed recording machine with the feeding device of the invention attached thereto and diagrammatically illustrating a portion of the control circuit for the feeding device connected to the machine.
Fig. 5 is a top plan view of one of the pinwheel portions of the feeding device with the platen illustrated in dot-dash outline and the record strip removed.
Fig. 6 is a side elevation view partially in section of the pinwheel of Fig. 5 with the record medium positioned thereon.
Fig. 7 is an elevation view of the pinwheel of Fig. 6 with the platen and record form arranged thereon.

Generally, the invention contemplates the provision of a record strip feeding device capable of high speed automatic operation through impulses provided by the recording machine. The strip feeding device is positioned above the recording station of the machine to allow the record strips to be suspended through the recording station. The strips are so positioned as to allow them to conform to the shape of the recording station and reconditioned for engaging the advancing mechanism of the feeding device. The forms are supported and reconditioned by a platen member provided with retractable pinwheels at opposite ends for engaging and feeding the forms through the recording station. The pinwheels allow the positive advancement of the record forms in response to the impulses provided by a synchronizing mechanism for the machine during non-imprinting cycles of the machine. The pinwheels cause the advancement of the record forms upon their rotation as a result of the withdrawal of a pawl member from an indexing plate. The pawl is withdrawn in response to the recording machine impulses which actuate an electronic switching means.

The record strip feeding device 10 of this invention is shown in the accompanying drawings as applied to a recording station 11 of high speed recording machine of the "Flying Typewriter" type, as manufactured by the Potter Instrument Co., Great Neck, Long Island, although the invention is also applicable to other high speed recording machines. The recording station 11 comprises a revolving typewheel 12 having a pair of type fonts 13 and 14 for presentation to a series of movable hammers 15. A recording medium 16 is suspended from the feeding device 10 to intermittently advance it between the typewheel 12 and the hammers 16.

The recording medium 16 of this invention is in the form of marginally punched continuous record strips or assembly of superposed record strips. The form lengths are designated by scored lines $16^a$ preweakened for severance and detachment at will. The forms may be either lined or unlined, being illustrated as unlined merely for simplicity of illustration. The strips 16 are further provided with the punched holes $16^b$, equally spaced along their outer margins. An assembly of superposed record strips 16 are stored upon a supply tray 17 positioned below the recording station 11 and are vertically advanced past a roller 18 through the recording station 11 and then collected in a receiving tray 19 for storage therein. The record strips 16 may be removed from the receiving tray 19 as desired.

The present invention is designed primarily for the feeding of the marginally punched record strips 16 by what is now commonly known as pinwheels 20. The pinwheels 20 support a pinwheel platen 21 and are keyed to the drive shaft 22 for unison rotary motion therewith. Thus, upon rotation of the drive shaft 22 the strips of series connected record forms 16 are progressively advanced past the recording station 11 a distance proportional to the amount of rotation of shaft 22. Accordingly, the present invention is an improvement of the feeding device described and claimed in the patent application of Percy G. Stimson and John T. Davidson, Serial No. 83,196, filed on March 24, 1949 and entitled "Strip Feeding Device." The invention disclosed in the aforementioned application has been modified to allow the strip feeding device 10 to be completely automatically controlled at high speeds.

To better understand the high speed automatic provisions required of the aforementioned "Flying Typewriter" the recording portion of the machine will be briefly described. Generally, the recording station 11 of the machine records on the record forms 16 through the striking of the solenoid actuated hammers 15 against the desired type provided in both type fonts 13 and 14. The hammers 15 are arranged in an arc around a portion of the typewheel 12 and strike the typewheel about the periphery thereof. A continuously advancing conventional typewriter ribbon 24 is passed between the record forms 16 and the typewheel 12 from a supply reel 25 to the take-up reel 26.

The rotating typewheel 12 is secured to a revolving shaft 27 for unitary rotation therewith. The hammers 15 strike the selected characters of the type fonts 13 or 14 "on the fly" as they are serially presented to the hammers. The hammers 15 are controlled or instructed in response to impulses from an electronic storage unit (not shown) associated with the recording machine.

Synchronization is maintained between the electronic storage unit and the revolving typewheel 12 by means of a photo-electric commutator generally identified by the reference character 28. The photo-electric commutator 28 continuously indicates the position of the typewheel 12 relative to the hammers 15.

The indication of the position of the typewheel 12 is provided by a disc 29 having slots $29^a$ therein of the same angular spacing as the type character for the fonts 13 and 14 and secured to shaft 27 for rotation therewith. The slots $29^a$ are photo-electrically counted by a photocell 30 associated with the photo-electric commutator 29 by a predetermined count counter as is well known in the art. The electrical impulses thusly generated are automatically distributed between the electronic storage unit and the feeding device 10, the latter receiving the impulses during the non-printing cycles of the machine as will be more fully described hereinafter.

As an example of the speed required of the feeding device 10 associated with this type of machine when it is provided with the pair of type fonts 13 and 14 on the typewheel 12, the typewheel may be assumed to be driven at a continuous rotating speed of 300 R. P. M. so that the hammers 15 strike with a contact time of approximately 100 micro-seconds. The type fonts 13 and 14 are positioned on the typewheel 12 to form an arc of approximately 100 degrees. During the interval that the type fonts 13 and 14 are not presented to the movable hammers 15, it is required that the record strips 16 be advanced. The record strips 16 must be advanced during the remaining 80 degree intervals, or in one-tenth of a second for a wheel revolving at 300 R. P. M. Accordingly, the electrical impulses derived from the photoelectric commutator 28 are delivered to the feeding device 10 every one-tenth of a second for triggering or advancing the record strips 16 to the next recording position.

The series of appropriately amplified electrical impulses from the commutator 28 are applied to an electronic switching device 32, in form of a triode, by means of the electrical lead 33 connected to the grid electrode of the device. The anode of the tube 32 is connected to the "B+" or direct current supply for the recording machine in series with a high speed relay 34. The relay 34 has its relay coil $34^a$ connected in series with the plate electrode of triode 32 and the "B+" supply and has its normally open movable armature $34^b$ connected in series with a power relay 35.

The armature $34^b$ is effective to control the energization of relay coil $35^a$ for relay 35. The relay coil $35^a$ is connected to an individual source of alternating current. The actuation of relay coil $35^a$ causes the actuation of the drive motor 36 through a series of motion transmitting members for causing the rotation of the pinwheels 20 as will be described more fully immediately hereafter.

The drive motor 36 for the feeding device 10 is supported within a frame 37, Fig. 1, positioned and fixed to the outer side plate $38^a$ of the feeding mechanism frame 38. Associated with the motor 36 there is provided a friction clutch 39, Fig. 2. The motor 38 and clutch 39 control the rotations of a stub shaft 40 connected to the clutch and rotatably mounted in the side plate $38^a$. The rotation of the stub shaft 40 is serially transmitted through suitable gearing to drive the drive shaft 22 and thereby advance the record strips 16. The one end of the drive shaft 22 is rotatably secured in the plate $38^a$ while its opposite end is rotatably supported in side plate 41. The entire assembly is held together by tie bolt 42 and may be secured to the frame of the recording machine.

The indexing plate 44 serves as the primary control for the strip feeding mechanism 10, the distance between the notches 45 determining the extent of strip feeding operation during each advancement of the device. The indexing plate plate 44 is secured to the back of the gear $45^a$ and both are concentrically fixed to the stub shaft 40 for the motor 36.

The drive between the pinwheels 20 and the indexing plate 44 and its associated gear $45^a$ is accomplished through the series of gears 46, 47 and 48; gears 47 and 48 comprising a compound gear mounted on stub shaft 50. The shaft 50 is carried by the lever 51 fixed to plate $38^a$ and pivotally mounted upon drive shaft 22 to allow an adjustment of the feeding mechanism to handle different forms as described in the aforementioned Stimson application. The gear 46 on the drive shaft 22 rotates in unison therewith and meshes with the gear 47. The gear 48 transmits rotary motion of the primary gear $45^a$ to the shaft 22 by means of the gears 46 and 47.

The motor 36 is intermittently energized in timed relation with the actuation of the tube 32 due to the delivery of the impulses thereto. The tube actuation in turn causes the actuation of the power relay 35 through its control relay 34.

Upon receiving an electrical impulse from the photo-electric commutating unit 28, the impulse, after being sufficiently amplified, if required, is applied to the grid electrode for the tube 32. This impulse causes the tube 32 to conduct and accordingly the anode current thereof passing through the relay coil $34^a$ causes the movement of its associated armature $34^b$. The movement of armature $34^b$ is effective to close the alternating current supply circuit connected to the coil $35^a$ for the power relay 35 to thereby energize the coil.

The power relay 35 has associated therewith its movable armature $35^b$. Upon the energization of the relay coil $35^a$, the movement of the relay armature $35^b$ positions it against the bell crank lever 53 to oscillate the latter in a counterclockwise direction. The bell crank 53 is rotatably mounted to a supporting stud 54 and is spring biased into normal engagement with the relay armature $35^b$. The spring biasing is provided by the spring 55. Also associated with the bell crank lever 53, there is provided a pivoted pusher member 56 mounted on the upper arm of the lever 53, which may be adjusted relative thereto.

Upon movement of the bell crank lever 53 in a counterclockwise direction the tip or nose of member 56 engages the tail portion of the spacing disk pawl 57 to oscillate the pawl in a clockwise direction about its mounting stud 58. The nose of member 56 and the cooperating tail portion of pawl 57 is so shaped that the member 56 clears the pawl 57 after initial engagement therewith, thereby leaving the pawl 57 free for return to its normal position under the influence of retractable spring 59.

Figures 2, 3, 4:
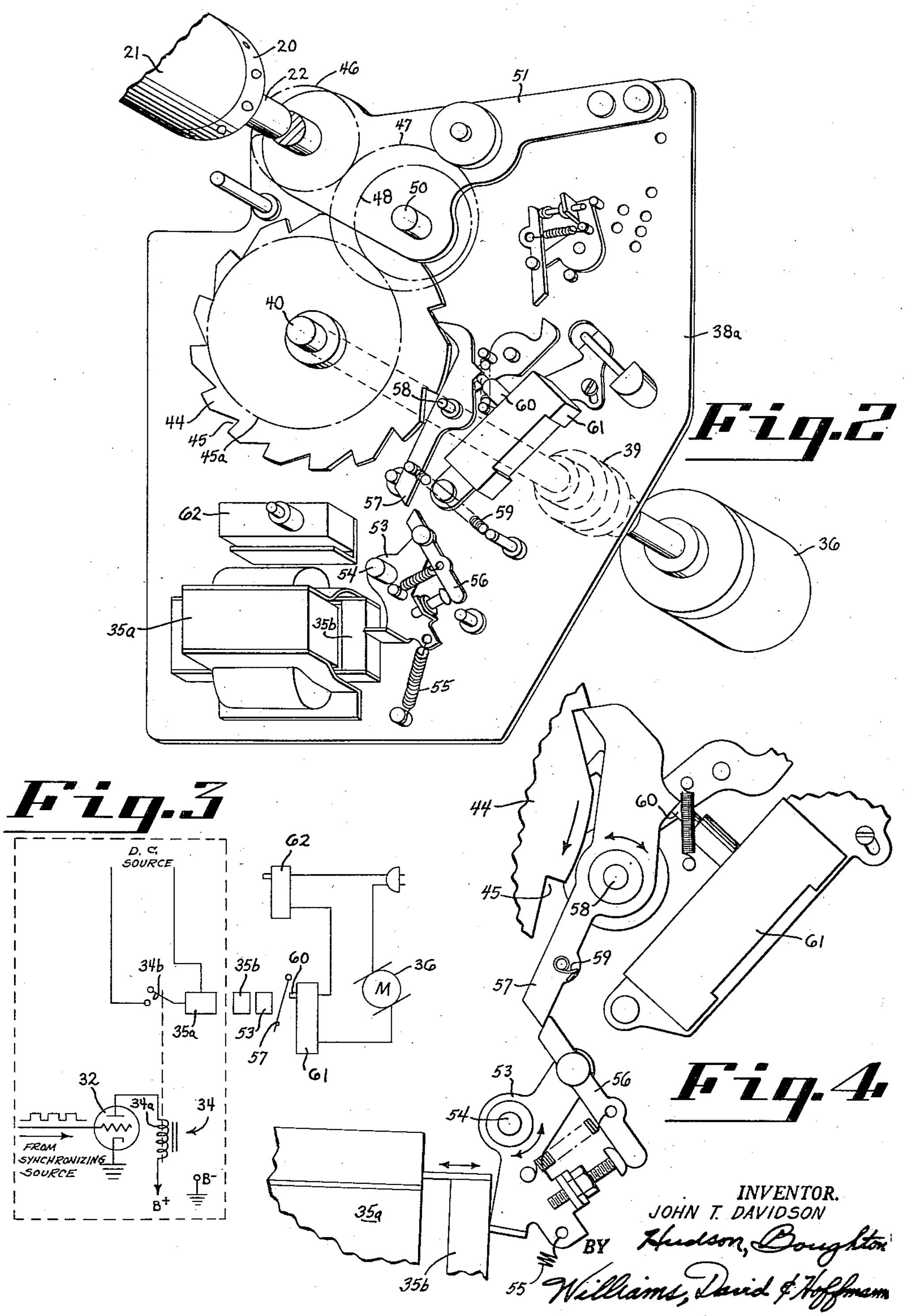
Fig. 2 is a perspective view of the advancing mechanism for the feeding device of Fig. 1 with the motor cover and frame removed to show the underlying structure.
Fig. 3 is a diagrammatic representation of the electrical control circuit for the feeding device.
Fig. 4 is an enlarged fragmentary view of a portion of the advancing mechanism illustrated in Fig. 2.

The various parts are shown in normal or rest position in Fig. 2, while in Fig. 4 the parts are shown partially operated. For example, the member 56 is just about to clear the tail of pawl 57, which clearance occurs simultaneously with the withdrawal of the upper arm of pawl 57 from the notch 45 in the indexing plate 44.

The actuation of the pawl 57 causes the engagement of the plunger arm 60 for closing the motor control switch 61. The motor control switch 61 is connected in series with the motor 36 along with the cover operated, normally closed, safety switch 62 to a source of alternating current for the motor. Accordingly, upon the de-energization of tube 32, the motor switch 61 is opened and the motor 36 is de-energized, thereby stopping the advancement of the forms 16.

An important feature of the invention is the provision of the platen 21 for reconditioning the record forms 16 after having assumed the arcuate shape of the recording station 11. The tubular platen 21 is supported by the pinwheel 20 and its companion right hand wheel (not shown). The pinwheel 20 is provided on its inner end with a flanged hub 64 for supporting the platen 21, the latter being either a solid or a sectional tube. The hub 64 includes a key 65 for engagement with an axial keyway 66 provided for the drive shaft 22 to secure the pinwheel 20 to the latter and is better viewed in Fig. 6. The drive shaft 22 is further provided with a series of axial cross cut keeper notches 67.

In mounting the platen 21 one of the pinwheels may be arranged to be stationary and the other one movable to allow the feeding unit to accept different size record forms as is well known in the art. The stationary pinwheel may be secured to the keeper notches 67. The movable pinwheel may be kept in position by a locking nut being held by a latch member seated in the notches 67.

To receive the recording forms 16 and aid in reconditioning them a pair of similar curvilinear guides are provided for the pinwheels. The guide 68 is provided for the pinwheel 20 to loosely overlie the margins of the recording forms 16 at the engaging point of the pinwheel. The guide 68 is slotted in order that the feeding pins $20^a$ and $20^b$ for the pinwheel 20 may project therethrough without obstructing their advancement and that of the record forms 16. The guide 68 is supported on a stationary plate 69 being an integral part of the feeding device 10.

The plate 69 includes a fixed hinge 70 having a pin 71 for supporting the guide 68. On the guide 68 is a stud 72 for securing one end of a tension spring 73 and having its other end secured to a stud 74 on the plate 69 to thereby retain the guide over the pins $20^a$, $20^b$, etc. The guide 68 is maintained in a stationary position by the stationary plate 69. Below the point of engagement of the pins $20^a$, etc. and the record forms 16, the plate 69 has a projecting arm 76 formed outwardly therefrom so as not to hinder the advancement of the forms.

In close relationship to the periphery of the plate 69 there is a pivoted lever 77 supported on a pin 78. A tension spring 79 is secured between a stud 80 on the lever 77 and an anchoring stud 81 in the plate 69. The tension spring 79 urges the bottom arm of the lever 77 counterclockwise and towards the arm 76, thereby acting to clamp the arms 76 and 77 against the tie rod 42. Accordingly, the plate 69 is held stationary relative to the rotary movement of pinwheel 20, but not transverse movement. The tie rod 42 is located slightly behind the point of tangency between the record forms 16 and the protruding pins $20^a$, etc. to prevent the forms from wedging as they engage the pins.

The pinwheel is illustrated with only the pins in the position of pins $20^a$ and $20^b$ to be projected from the pinwheel 20 for engaging the marginal holes $16^b$ in the record forms 16. A cam and a cam disc are provided to cause the projection of the pins $20^a$ and $20^b$ upon reaching these desired points and their retraction upon passage beyond. The aforementioned cam and cam disc are not illustrated since reference may be had to the patent of J. Q. Sherman, 2,000,649 of June 8, 1931, for a complete description, construction and mode of operation thereof. The cam disc when adjusted in accordance with the aforementioned Sherman patent may be adjustably secured by means of a screw 83 extending through the arcuate slot 84 provided for the plate 69. A second arcuate slot 85 is also provided for adjusting the cam disc within the limits of the slot.

A spacing disc 86 is provided for maintaining the spacing between the plate 69 and the pinwheel 20 normally occupied by a cam locating disc for manually adjusting the point of projection of the pins $20^a$, etc. as may be necessary in the slower operating or manually operated machines. The disc 86 further acts to maintain the relative positioning between the feeding pins $20^a$, etc. and the slot in the guide 68.

From the accompanying drawings, and the foregoing description, it will accordingly be understood that the invention has provided a novel high speed feeding device for an automatic recording machine having no manual operations or adjustments. The high speed feeding device suspends the recording strips through the recording station to allow the strips to assume the arcuate configuration of the recording station yet positively advancing the strips in response to an electrical impulse. The necessity for positive advancement is readily appreciated when lined recording forms are utilized and it is further required to imprint in preselected areas of the lines. This positive advancement is accomplished by this invention in a manner not previously possible with friction, wind-up rolls or other non-positive means to allow manifold copies to be simultaneously imprinted at a single recording station.

The electrical impulses derived from the recording machine cause the actuation of an indexing plate for intermittently advancing the record forms. The forms are advanced through rotatable pinwheels supporting a platen in response to the actuation of the indexing plate, The platen acts to recondition the record forms to allow their engagement with the pinwheels.

Although preferred forms of the invention have been described and illustrated herein, it will be understood that the invention may be embodied in other forms coming within the scope and meaning of the appended claims.

Having thus described my invention, I claim:

1. In an automatically operated recording machine, a strip feeding mechanism for intermittently advancing record forms past a record receiving position, including an intermittently operated strip feeding device for the strip, an intermittently energized source of power for the strip feeding device, an oscillatory control member common to the strip feeding device and power source for controlling operation of both by virtue of its oscillatory motion, and means for automatically oscillating said control member in timed relation with the automatic operation of the recording machine, said latter means including electronic actuating means responsive to electrical impulses generated within the recording machine.

2. In a strip feeding mechanism for an automatically controlled recording machine, a strip feeding device for intermittently advancing a continuous record strip through a recording station, a source of power for said strip feeding device, drive mechanism for the strip feeding device and for engaging the record forms to positively advance same, common control means interposed between said drive mechanism and said source of power having motion causing the actuation of the power supply to allow the advancement of the record forms, and switching means responsive to electrical impulses derived from the recording machine for automatically and momentarily actuating the common control means in timed relationship with the recording machine.

3. In an automatic electronically controlled recording machine having a recording station wherein a revolving type wheel is presented to a plurality of movable hammers for imprinting upon record form strips passing therebetween characterized by strip feeding mechanism spaced from and in substantial alignment with the recording station for advancing the strips through the recording station in intermittent step by step movements of predetermined extent comprising a rotary feeding device engageable with the record strips and an actuating unit therefor including an indexing plate, means for arresting the indexing plate in predetermined positions of rotary adjustment including a pawl normally engageable with peripheral notches formed on the indexing plate to arrest rotary motion thereof, electrical stimulus responsive means including an electron discharge device connected to a stimulus generating source within the recording machine, switching means interconnecting said stimulus responsive means and the pawl for withdrawing the pawl from a notch in the indexing plate permitting rotary movement of the indexing plate, switching means operative upon the withdrawal of said pawl to energize the actuating unit and allow the advancement of the strip feeding mechanism to the next succeeding position of the indexing plate, the construction and arrangement being such that the strip feeding device is operated through intermittent step by step movements in timed relationship with predetermined operations of the recording machine.

4. In an automatic electronically controlled recording machine wherein the recording station includes a revolving typewheel and a series of movable hammers arcuately spaced therefrom for imprinting upon record-form strips suspended therebetween characterized by strip feeding mechanism spaced above and in substantantial alignment with the recording station for advancing the strips through the recording station in intermittent step-by-step movements and allowing the record-form strips to assume a shape conformable to the shape of the recording station comprising a rotary feeding device engageable with the record strips having means for reconditioning the record forms for engagement with said rotary device, the rotary device also including an actuating unit therefor and an indexing plate, means for arresting the indexing plate in predetermined positions of rotary adjustment including a pawl normally engageable with peripheral notches formed on the indexing plate being operative to arrest rotary motion thereof, electrical stimulus responsive means connected to a stimulus generating source within the recording machine, switching means interconnecting said stimulus responsive means and the pawl for withdrawing the pawl from a notch on said plate and responding to the withdrawn position of the pawl to energize the actuating unit to allow the advancement of the strip feeding mechanism to the next succeeding position of the indexing plate, the construction and arrangement being such that the strip feeding device is operated through intermittent step by step movements in timed relationship with predetermined operations of the recording machine.

5. The apparatus as defined in claim 4 including the record-form strips wherein the rotary feeding device comprises a plurality of rotatable pinwheels for engaging the record form strips and supporting a platen therebetween for reconditioning the record forms to allow their engagement with the pinwheels.

6. In an automatic electronically controlled recording machine wherein the recording station includes a revolving type wheel and a series of movable hammers spaced therefrom for imprinting upon record-form strips suspended therebetween characterized by strip feeding mechanism spaced above and in substantial alignment with the recording station for advancing the strips through the recording station in intermittent step-by-step movements and for suspending the record-form strips to allow them to assume a shape conformable to the shape of the recording station comprising a driven shaft, a plurality of spaced apart pinwheels secured to the driven shaft, a member supported between the pinwheels for reconditioning the record strips to allow their engagement with the pinwheels, the pinwheels being engageable with the record strips at a bight thereof, an actuating unit for the driven shaft, a controllable indexing plate connected between the actuating unit and the driven shaft for intermittently driving the latter, means for arresting the indexing plate in predetermined positions of rotary adjustment including a pawl normally engageable with peripheral notches arranged on the indexing plate to arrest rotary motion thereof, electrical voltage sensitive switching means connected to a simulus generating synchronizing source within the recording machine, magnetic switching means interconnecting the pawl and said voltage switching means for responding to the latter means to withdraw the pawl from a notch in the indexing plate permitting rotary movement of the plate until the pawl engages with the next succeeding notch thereon and switching means responding to the withdrawn position of the pawl to energize the actuating unit and rotating the strip feeding mechanism to the next succeeding position of the indexing plate.

References Cited in the file of this patent

UNITED STATES PATENTS

| | | |
|---|---|---|
| 1,925,735 | Sundstrand | Sept. 5, 1933 |
| 2,096,509 | Garbell | Oct. 19, 1937 |
| 2,318,020 | Sherman | May 4, 1943 |
| 2,348,059 | Daly | May 2, 1944 |
| 2,392,838 | Davidson | Jan. 15, 1946 |
| 2,566,944 | Last | Sept. 4, 1951 |
| 2,683,599 | Davidson | July 13, 1954 |
| 2,692,551 | Potter | Oct. 26, 1954 |